(12) United States Patent
Ogasawara (10) Patent No.: US 10,440,214 B2
(45) Date of Patent: Oct. 8, 2019

(54) IMAGE READING DEVICE AND IMAGE FORMING APPARATUS

(71) Applicant: CANON KABUSHIKI KAISHA, Tokyo (JP)

(72) Inventor: Akio Ogasawara, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/727,950

(22) Filed: Oct. 9, 2017

(65) Prior Publication Data

US 2018/0103173 A1    Apr. 12, 2018

(30) Foreign Application Priority Data

Oct. 11, 2016 (JP) ................. 2016-200409

(51) Int. Cl.
*H04N 1/00* (2006.01)
*H04N 1/12* (2006.01)
*H04N 1/21* (2006.01)

(52) U.S. Cl.
CPC ......... *H04N 1/121* (2013.01); *H04N 1/00206* (2013.01); *H04N 1/00554* (2013.01); *H04N 1/21* (2013.01)

(58) Field of Classification Search
CPC .......... H04N 1/00206; H04N 1/00557; H04N 1/0057; H04N 1/00795; H04N 1/121; H04N 1/00018; H04N 1/00519; H04N 1/00538; H04N 1/00554; H04N 1/00559; H04N 1/00567
USPC ............... 358/1.14, 1.15, 474, 498
See application file for complete search history.

(56) References Cited

U.S. PATENT DOCUMENTS

| 5,644,663 A * | 7/1997 | Saito ................. H04N 1/00519 358/473 |
| 5,726,770 A | 3/1998 | Harada |
| 5,831,751 A * | 11/1998 | Ohneda .................... H04N 1/52 358/521 |
| 6,252,684 B1 * | 6/2001 | Lin .................... H04N 1/00127 358/498 |
| 6,788,830 B1 * | 9/2004 | Morikawa ................ H04N 1/21 382/305 |
| 7,003,176 B1 * | 2/2006 | Suzuki ................. G06T 3/4015 345/3.3 |
| 8,514,463 B2 | 8/2013 | Fujiwara |
| 8,548,520 B2 | 10/2013 | Connors |

(Continued)

FOREIGN PATENT DOCUMENTS

| CN | 1423467 A | 6/2003 |
| CN | 1918579 A | 2/2007 |

(Continued)

*Primary Examiner* — Negussie Worku
(74) *Attorney, Agent, or Firm* — Canon U.S.A., Inc. IP Division (57) ABSTRACT

An image reading device includes a turning unit and a reading unit having a reader. The reader reads an image on a sheet. The turning unit can turn with respect to the reading unit. The turning unit includes a communication unit and a storage portion. The communication unit receives data from outside the image reading device by wirelessly communication and includes a communication main unit detachably mounted within the turning unit and a communication cable that transfers data received by the communication main unit. The storage portion stores the communication cable.

19 Claims, 13 Drawing Sheets

(56) References Cited

U.S. PATENT DOCUMENTS

| | | |
|---|---|---|
| 9,089,064 B2 | 7/2015 | Katsuyama |
| 10,082,994 B1 | 9/2018 | Ruiz |
| 2002/0106217 A1 | 8/2002 | Ando |
| 2003/0037114 A1* | 2/2003 | Nishio .................... H04L 51/28 |
| | | 709/206 |
| 2003/0062471 A1 | 4/2003 | Hayashi |
| 2003/0063331 A1 | 4/2003 | Hayashi |
| 2003/0075605 A1 | 4/2003 | Chien |
| 2004/0004644 A1 | 1/2004 | Komatsu |
| 2005/0104148 A1 | 5/2005 | Yamamoto |
| 2006/0071386 A1 | 4/2006 | Mizubata |
| 2006/0104653 A1 | 5/2006 | Yamamoto |
| 2006/0139700 A1 | 6/2006 | Murakami |
| 2006/0193013 A1 | 8/2006 | Hoshi |
| 2006/0203306 A1 | 9/2006 | Hoshi |
| 2007/0064252 A1* | 3/2007 | Iwago .................. G03G 15/234 |
| | | 358/1.12 |
| 2007/0065197 A1 | 3/2007 | Tanaka |
| 2007/0170254 A1 | 7/2007 | Ishihara |
| 2008/0061990 A1 | 3/2008 | Milnes |
| 2008/0316541 A1 | 12/2008 | Takata |
| 2009/0316222 A1 | 12/2009 | Oshida |
| 2010/0039659 A1 | 2/2010 | Suzuki |
| 2010/0061782 A1 | 3/2010 | Harada |
| 2010/0221032 A1 | 9/2010 | Ishio |
| 2010/0321729 A1 | 12/2010 | Yagi |
| 2011/0075226 A1 | 3/2011 | Fujiwara |
| 2011/0292356 A1 | 12/2011 | Tsukinoki |
| 2011/0292366 A1 | 12/2011 | Glushkov |
| 2012/0027465 A1 | 2/2012 | Yamamoto |
| 2012/0099134 A1 | 4/2012 | Harigae |
| 2012/0114381 A1* | 5/2012 | Okoshi .............. G03G 15/0879 |
| | | 399/227 |
| 2012/0218172 A1 | 8/2012 | Border |
| 2013/0194599 A1* | 8/2013 | Tomoda ............. H04N 1/00525 |
| | | 358/1.13 |
| 2013/0235429 A1 | 9/2013 | Kitagawa |
| 2014/0029041 A1 | 1/2014 | Okubo |
| 2014/0118439 A1 | 5/2014 | Kambe |
| 2014/0118764 A1 | 5/2014 | Maghakian |
| 2014/0132652 A1 | 5/2014 | Nakamura |
| 2014/0169823 A1 | 6/2014 | Ishida |
| 2014/0233162 A1* | 8/2014 | Katsuyama .......... H04N 1/0035 |
| | | 361/679.01 |
| 2014/0306402 A1 | 10/2014 | Onishi |
| 2014/0327926 A1 | 11/2014 | Katsuyama |
| 2015/0043955 A1* | 2/2015 | Nishizawa ......... G03G 15/6582 |
| | | 399/407 |
| 2015/0281511 A1* | 10/2015 | Furutani ............ H04N 1/32641 |
| | | 358/1.14 |
| 2016/0057296 A1 | 2/2016 | Tamura |
| 2016/0094740 A1 | 3/2016 | Sunohara |
| 2016/0142575 A1 | 5/2016 | Yokoyama |
| 2016/0186762 A1* | 6/2016 | Rautenstrauch ...... F04D 19/022 |
| | | 415/68 |
| 2016/0191746 A1 | 6/2016 | Yokoyama |
| 2016/0269581 A1* | 9/2016 | Matsunami ........ H04N 1/00557 |
| 2016/0301824 A1 | 10/2016 | Shibao |
| 2016/0360046 A1* | 12/2016 | Katayama ............ H04N 1/0057 |
| 2016/0360057 A1* | 12/2016 | Ogasawara ........ H04N 1/00795 |
| 2017/0223217 A1 | 8/2017 | Hama |
| 2017/0336746 A1 | 11/2017 | Mizuguchi |
| 2017/0359470 A1 | 12/2017 | Takahashi |
| 2018/0101344 A1* | 4/2018 | Hishinuma ........... G06F 3/1222 |
| 2018/0103156 A1* | 4/2018 | Yamada ............. H04N 1/00013 |
| 2018/0103165 A1* | 4/2018 | Yamamoto ........ H04N 1/00567 |
| 2018/0103166 A1* | 4/2018 | Katayama ......... H04N 1/00018 |
| 2018/0103167 A1* | 4/2018 | Ogasawara ........ H04N 1/00798 |
| 2018/0103173 A1 | 4/2018 | Ogasawara |
| 2018/0307450 A1 | 10/2018 | Pandi |

FOREIGN PATENT DOCUMENTS

| | | |
|---|---|---|
| CN | 101212534 A | 7/2008 |
| CN | 103106360 A | 5/2013 |
| CN | 105190447 A | 12/2015 |
| JP | S64-50069 A | 2/1989 |
| JP | 2003241443 A | 8/2003 |
| JP | 2006025331 A | 1/2006 |
| JP | 2006080863 A | 3/2006 |
| JP | 2009192861 A | 8/2009 |
| JP | 2010250038 A | 11/2010 |
| JP | 2012210801 A | 11/2012 |
| JP | 2013030042 A | 2/2013 |
| JP | 2015115798 A | 6/2015 |

* cited by examiner

IMAGE READING DEVICE AND IMAGE FORMING APPARATUS

BACKGROUND OF THE INVENTION

Field of the Invention

The present disclosure relates to an image reading device that reads images on sheets, and to an image forming apparatus having the same.

Description of the Related Art

There are known image forming apparatuses and the like using electrophotography that ask for personal authentication by IC card to improve security. An authentication device that performs the personal authentication is disposed at a position adjacent to an operation panel provided to the image forming apparatus main unit (U.S. Pat. No. 9,089,064), provided on a side face of the image forming apparatus main unit (Japanese Patent Laid-Open No. 2013-30042), and so forth.

SUMMARY OF THE INVENTION

An image reading device according to an aspect of the present invention includes a reading unit having a reader configured to read an image on a sheet, and a turning unit configured to turn with respect to the reading unit, wherein the turning unit includes a communication unit and a storage portion, wherein the communication unit is configured to receive data from outside the image reading device by wirelessly communication and includes a communication main unit detachably mounted within the turning unit and a communication cable configured to transfer data received by the communication main unit, and wherein the storage portion is configured to store the communication cable.

Further features of the present invention will become apparent from the following description of exemplary embodiments with reference to the attached drawings.

BRIEF DESCRIPTION OF THE DRAWINGS

FIGS. 1A and 1B are diagrams illustrating an image forming apparatus according to a first embodiment, where

FIGS. 2A and 2B are diagrams illustrating an image forming device according to the first embodiment, where

FIGS. 3A and 3B are diagrams regarding the first embodiment, where

FIGS. 4A and 4B are diagrams regarding the document feeder, where

FIGS. 5A and 5B are perspective views, where

FIGS. 8A and 8B are explanatory diagrams regarding the first embodiment, where

DESCRIPTION OF THE EMBODIMENTS

An embodiment will be described in detail with reference to the drawings. An image reading device can make up a standalone configuration such as a flat-bed scanner, and can also be used as an image reading unit in an image forming apparatus such as a photocopier or facsimile device or the like. The image reading device also may have an automatic document feeder (hereinafter referred to as "document feeder"), and be of a configuration where documents are read while being conveyed. Note that the dimensions, materials, shapes, relative layouts, and so forth of components described in the following embodiment do not restrict the present invention in any way, unless specifically stated.

First Embodiment

Overview of Configuration

Figure 1A:
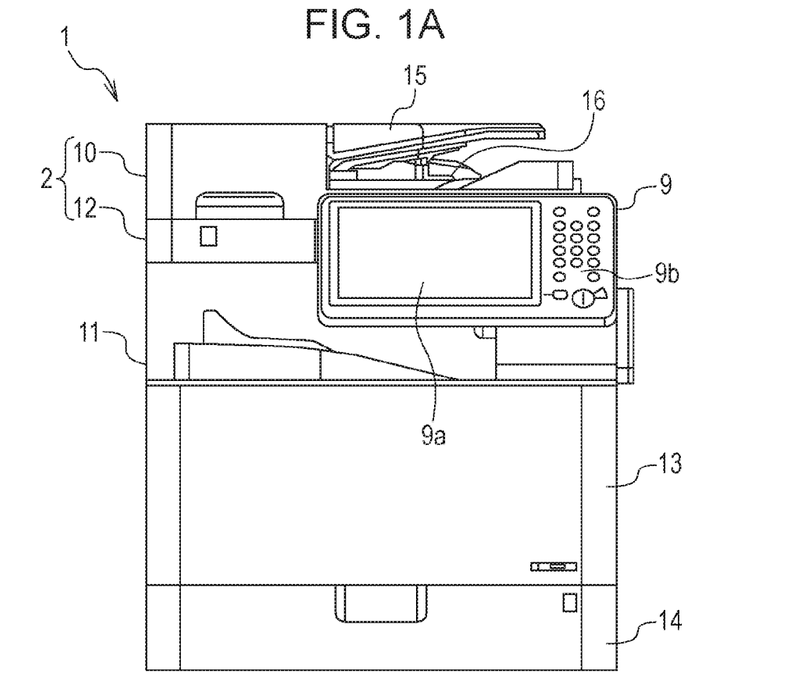
FIG. 1A is a frontal view and FIG. 1B is a perspective view.
Figure 1B:
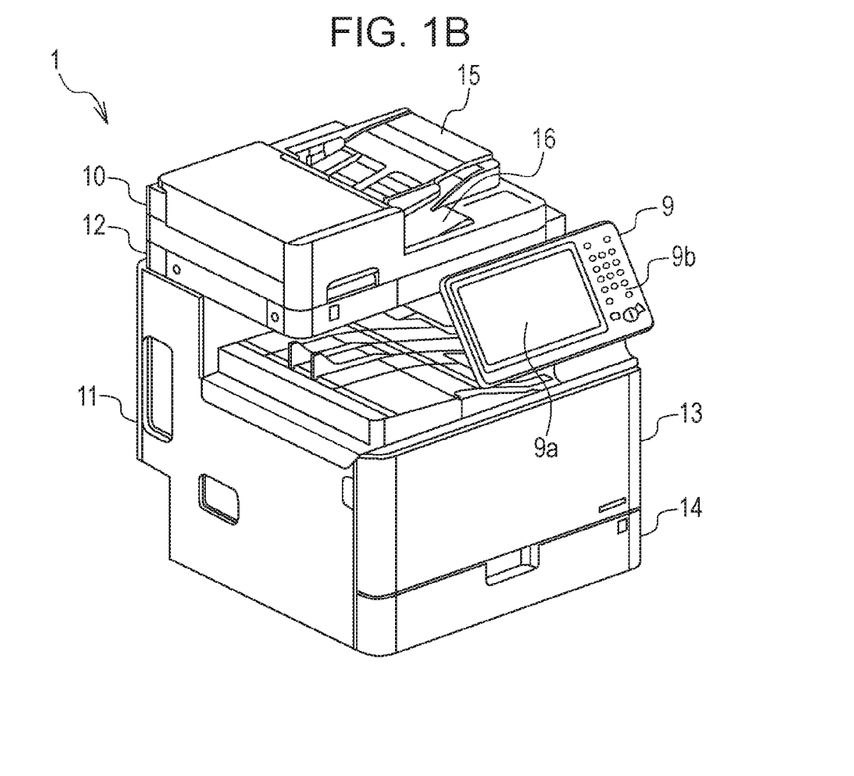

FIG. 1A is a frontal diagram of an image forming apparatus 1. FIG. 1B is a perspective view of the image forming apparatus 1.

The image forming apparatus 1 includes an image reading device 2 and an image forming apparatus main unit 11. The image reading device 2 includes a document feeder 10 that is a turning unit, a reader unit 12 that is a reading unit, a document stacking tray 15, and a document discharge tray 16. The image forming apparatus main unit 11 includes an image forming unit 13, a sheet feeding unit 14, and an operating panel 9. The operating panel 9 has an image display unit 9a and a keypad 9b. The image forming unit 13 is provided within the image forming apparatus main unit 11, and forms images by a known electrophotography system. The image forming unit 13 has a photosensitive member, an exposing device, a developing device, a transfer device, and a fixing device. The exposing device forms an electrostatic latent image on the photosensitive member based on image information. The developing device develops the electrostatic latent image into a toner image using toner. The transfer device transfers the toner image onto a sheet of recording medium conveyed from the sheet feeding unit 14. The fixing device fixes the toner image on the recording medium onto the recording medium. In a case of copying, the image information is generated by reading a document by the image reading device 2, which is transmitted to the image forming unit 13. In a case of printing, the image information is transmitted from an external device to the image forming unit 13 as a print job.

Figure 2A:
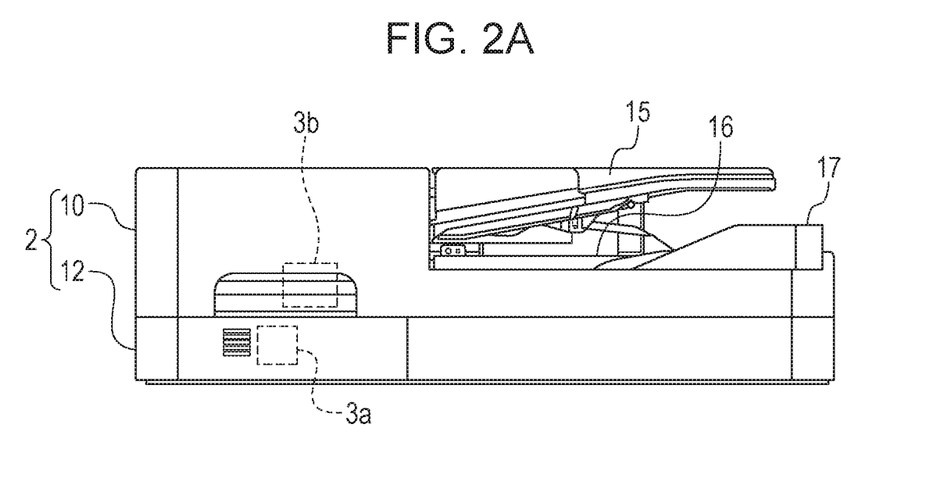
FIG. 2A is a frontal view and FIG. 2B is a perspective view.
Figure 2B:
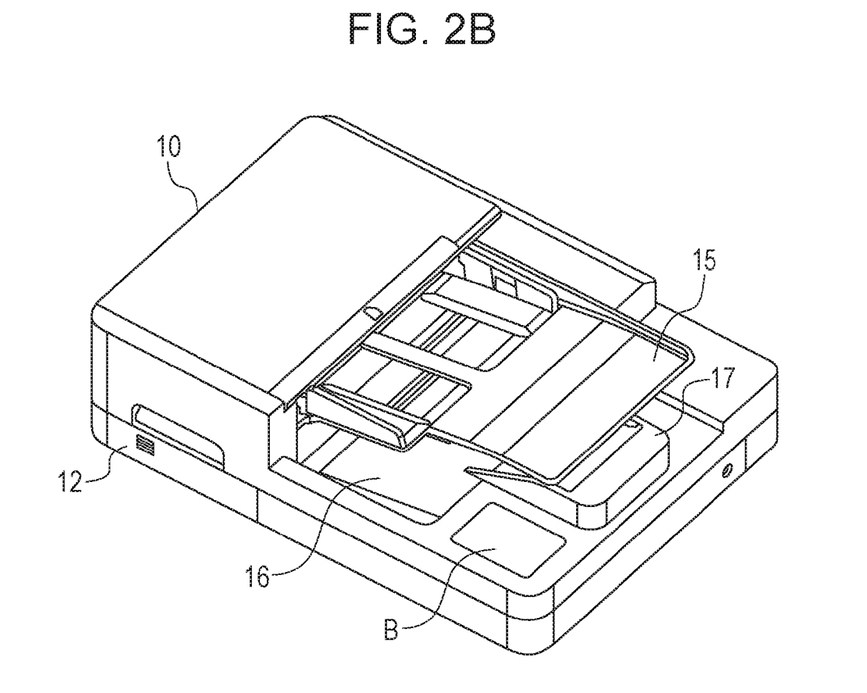

FIG. 2A is an enlarged frontal view of the image reading device 2 in FIG. 1A. FIG. 2B is an enlarged perspective view of the image reading device 2 in FIG. 1B.

The document stacking tray 15 and document discharge tray 16 of the image reading device 2 are configured to overlap at least partly in the vertical direction. An authentication unit B is provided on the front side of the document feeder 10. A card reader 18 that acquires authentication information of a user is provided within the authentication unit B. The card reader 18 serves to communicate with the user by wireless communication, and more specifically is a non-contact IC card reader. The user causes the card reader 18 to read the authentication information of the card, by holding the authentication card up to the authentication unit B. Authentication information read by the card reader 18 is matched with user information stored in the image forming apparatus 1, and the image forming apparatus 1 authenticates the user. Note that the user information may be stored in a server connected to the image forming apparatus 1 by a network.

Description will be made regarding a case of performing document flow reading using the image reading device 2. The user loads a document on the document stacking tray 15, and instructs the reading of the document at the operating panel 9. The document is fed by a sheet feed roller that is omitted from illustration, and is conveyed to a position where an image can be read by a reading unit 3a. The reading unit 3a reads the image on the surface of the document. Note that in a case of reading both faces of the document, an image on the rear face of the document is also read, by a reading unit 3b. A compact image sensor (CIS) or complementary metal-oxide semiconductor (CMOS) sensor may be applied for the reading unit 3a. The document discharge tray 16 is provided with an inclined portion 17. The inclined portion 17 is arranged to protrude more than adjacent portions. A document discharged to the document discharge tray 16 rests with just the middle portion thereof in the lateral direction (the direction orthogonal to the conveyance direction of the document) thereof being raised by the inclined portion 17. Accordingly, a gap between the document discharge tray 16 and the document is created at the edge portions of the document in the lateral direction, enabling the user to insert his/her hand into the gap, thereby facilitating easy removal of the document by the user.

Figure 3A:
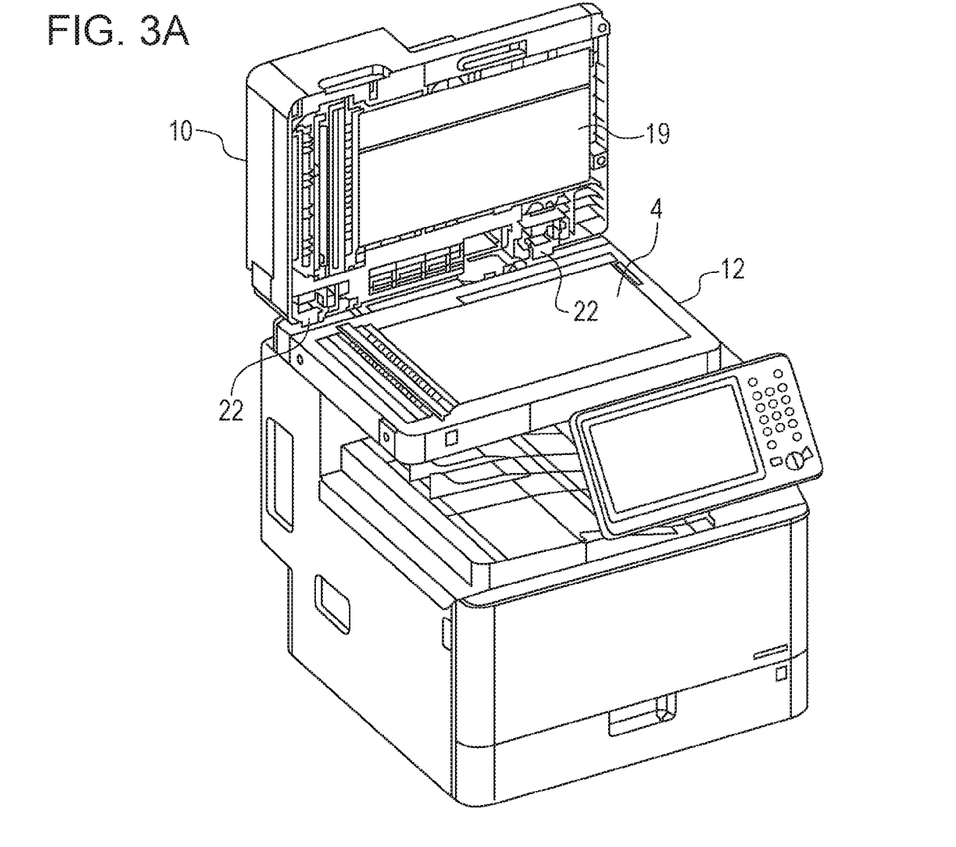
FIG. 3A is a perspective view illustrating a document feeder that is in an open state as to a reader unit.
Figure 3B:
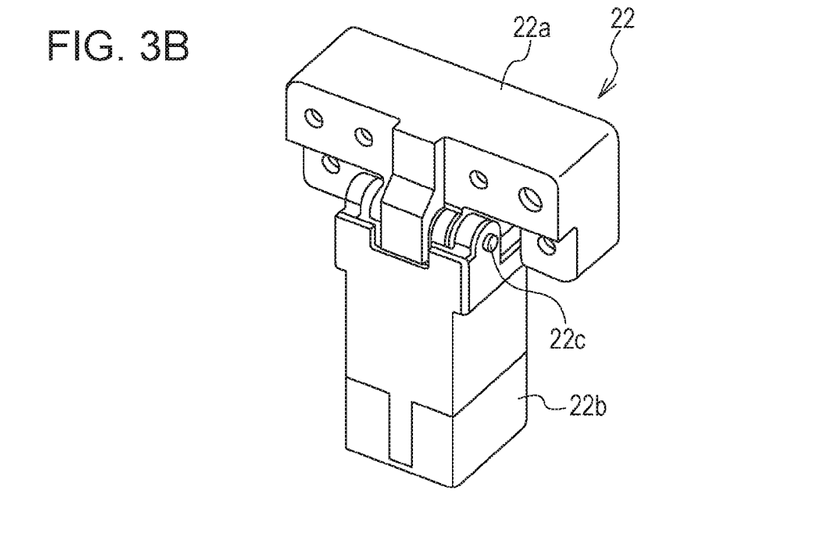
FIG. 3B is an enlarged view of a hinge.

FIG. 3A is a perspective view illustrating a state where the document feeder 10 is opened as to the reader unit 12. The document feeder 10 is provided capable of turning as to the reader unit 12 on a hinge 22. The document feeder 10 can assume an open position where a reading glass 4 is open, and a closed position where the reading glass 4 is blocked, due to the document feeder 10 turning. The document feeder 10 has a document pressing plate 19. The document pressing plate 19 is configured to press the document upon the reading glass 4 when the document feeder 10 is in the closed position. The reader unit 12 has the reading glass 4. FIG. 3B is an enlarged view of the hinge 22.

FIG. 3B is an enlarged diagram of the hinge 22. A coupling portion 22a serves to couple the document feeder 10 and hinge 22 to each other. A coupling portion 22b serves to couple the reader unit 12 and the hinge 22 to each other. The hinge 22 has a rotation shaft 22c, and is structured such that the document feeder 10 can turn as to the reader unit 12 on the rotation shaft 22c.

A case of loading a document on the reading glass 4 and performing reading will be described. The user opens the document feeder 10 to expose the reading glass 4. The user loads the document on the reading glass 4 with the image facing downwards, and closes the document feeder 10. The document pressing plate 19 of the document feeder 10 presses the document against the reading glass 4. When the user instructs reading of the document from the operating panel 9, the reading unit 3a moves and reads the image on the document.

Document Discharge Tray 16 (Attachment Method and Configuration of Card Reader 18)

Figure 4A:
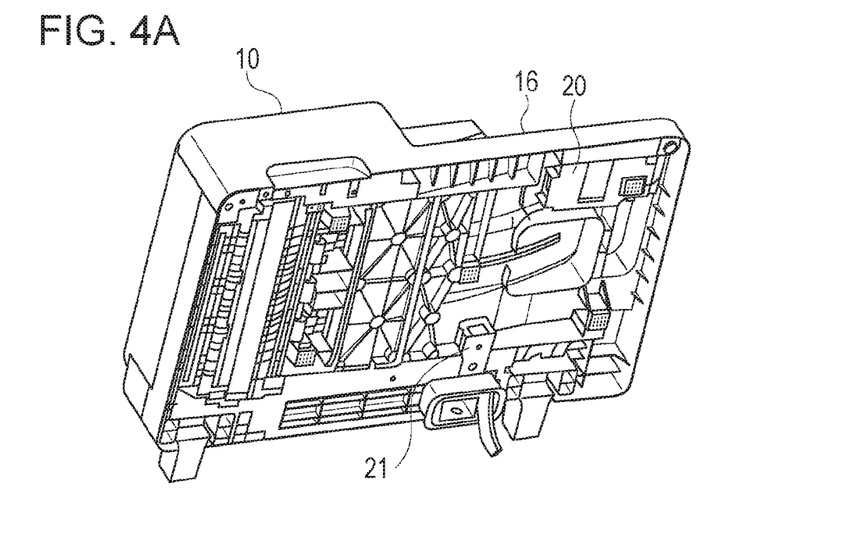
FIG. 4A is a perspective view of a state where a document pressing plate is removed therefrom.
Figure 4B:
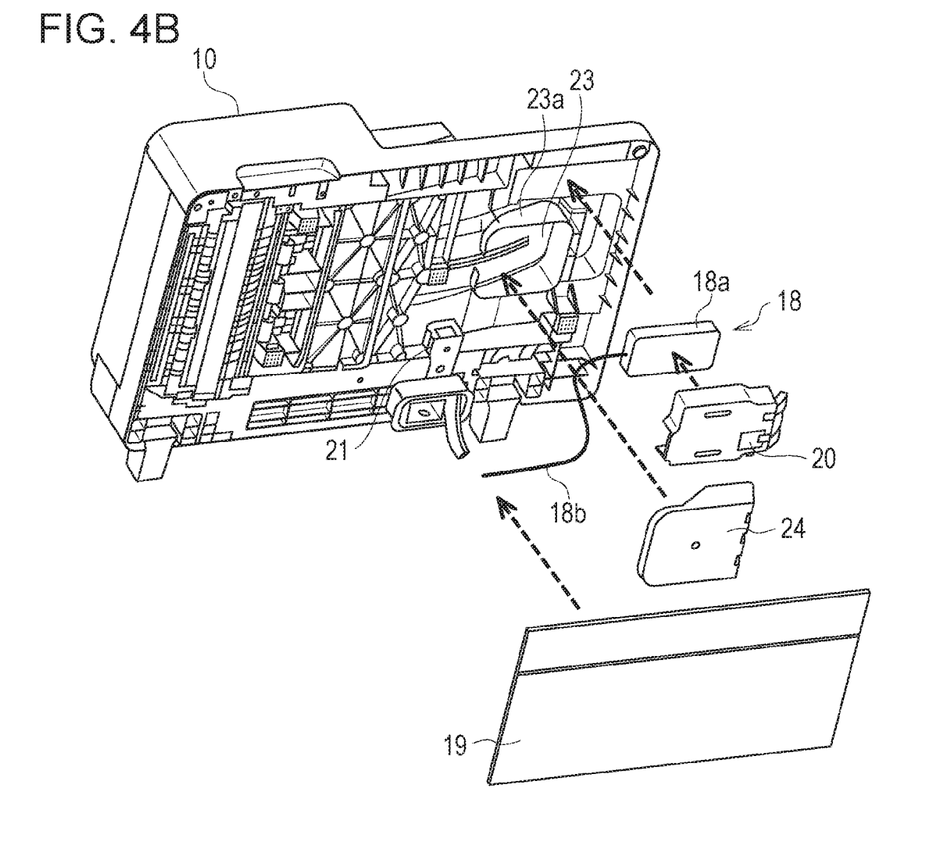
FIG. 4B is an explanatory diagram in a case of attaching a card reader thereto.

FIG. 4A is a perspective view of a state where the document pressing plate 19 of the document feeder 10 has been removed. FIG. 4B is an explanatory diagram where the card reader 18 has been attached to the document feeder 10. A method of attaching the card reader 18 to the inside of the document discharge tray 16 of the document feeder 10, and the structure of an attaching portion, will be described with reference to FIGS. 4A and 4B.

Depending on the location of installation and usage of the image forming apparatus 1, the authentication device such as the card reader 18 or the like does not necessarily have to be provided to the image forming apparatus 1. For example, in a case where the location of installation of the image forming apparatus 1 is in a public facility and authenticating users is difficult, or in a case where only a few trusted people will be using the image forming apparatus 1, the card reader 18 does not necessarily have to be provided. Accordingly, the card reader 18 seldom is a standard feature, and usually is an additional option. Thus, the configuration is such that the card reader 18 can be easily attached later.

The work of attachment may be performed by service staff, or by the user. A case of attaching the optional card reader 18 will be described. The document feeder 10 is opened approximately 90 degrees by the hinge 22 that couples the document feeder 10 and the reader unit 12, as illustrated in FIG. 3A. The document pressing plate 19 is detachably attached to the document feeder 10. Removing the document pressing plate 19 from the document feeder 10 exposes the interior of the document discharge tray 16, as illustrated in FIG. 4A. An attachment part 20, a cover member 24, and a USB connecting unit 21b are disposed on the inside of the document discharge tray 16. The USB connecting unit 21b is connected to a controller provided to the document feeder 10. The main unit cover member 20 and cover member 24 are detachably mounted within the document discharge tray 16. The card reader 18 includes the card reader main unit 18a (communication main unit) that is a card reading unit, and the USB cable 18b that is a communication cable.

The main unit cover member 20 is removed from the document discharge tray 16. The card reader main unit 18a is held in the main unit cover member 20, and the main unit cover member 20 is fixed within the document discharge tray 16. A USB connector is provided at the end of the USB cable 18b, the USB connector being connected to the USB connecting unit 21b. Attaching the card reader 18 in this way enables the controller of the document feeder 10 to communicate with the card reader 18.

Now, there are various types of card readers 18 depending on the manufacturer, and accordingly various lengths of the USB cable 18b exist, from around 40 cm to around 180 cm. The document feeder 10 is provided so as to be capable of opening/closing as to the reader unit 12. Accordingly, if the USB cable 18b is stored within the document feeder 10 without being appropriately bundled when attaching the card reader 18, the USB cable 18b may move within the document feeder 10 due to the opening/closing actions of the document feeder 10. Consequently, the USB cable 18b may strike members in the vicinity and generate abnormal sounds. Alternatively, the USB cable 18b may become crimped by members in the vicinity, such as the document pressing plate 19 for example, when attaching the card reader 18 as described above, which can result in wire breakage.

In the present embodiment, a storage portion 23 that is a storage unit for storing the excess USB cable 18b extending from the card reader 18 is provided within the document feeder 10. The storage portion 23 is formed as a rectangular rib 23a on the inner side of the document discharge tray 16. The USB cable 18b is stored in a region on the inner side of the rib 23a.

Figure 5A:
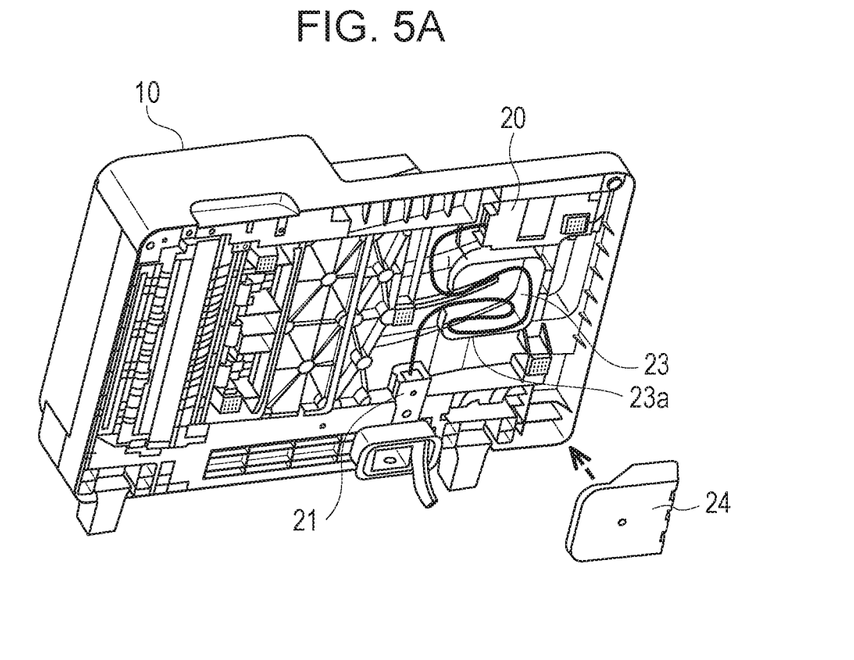
FIG. 5A illustrates a state in which a Universal Serial Bus (USB) cable is stored in a storage unit.
Figure 5B:
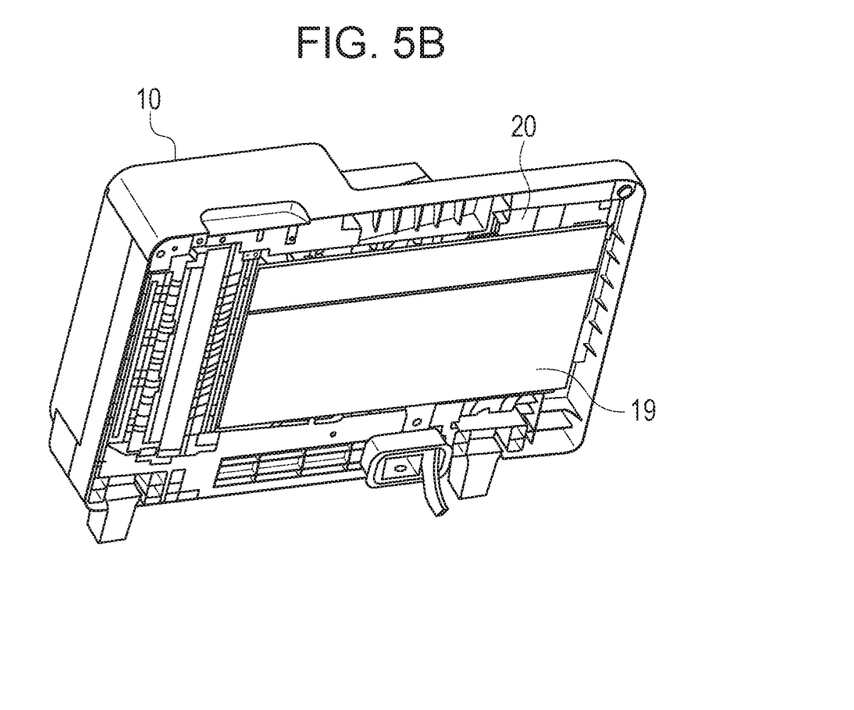
FIG. 5B illustrates a state in which the document pressing plate of the feeder is mounted.

FIG. 5A is a perspective view of a state where the USB cable 18b is stored in the storage portion 23, and FIG. 5B is a perspective view of a state where the document pressing plate 19 of the document feeder 10 has been mounted. Storing the USB cable 18b of the card reader 18 in the storage portion 23 will be described now. It can be seen from FIG. 5A that the USB cable 18b is stored in a bundled state in an interior space surrounded by the rib 23a. The USB cable 18b is covered by the cover member 24 so as to not protrude from the rib 23a, and then the space is closed by the document pressing plate 19 (FIG. 5B).

According to the present embodiment, the excess portion of the USB cable 18b is stored in the storage portion 23, so the excess portion of the USB cable 18b does not protrude from the storage portion 23 and impede movement of the document pressing plate 19. As a result, even if the user opens and closes the document feeder 10, the excess portion of the USB cable 18b is restrained to a certain extent, so a situation where the USB cable 18b strikes another member and generates abnormal sounds does not readily occur. Further, there is no concern of the USB cable 18b being pinched between the document discharge tray 16 or document feeder 10 and document pressing plate 19, or other like nearby parts, that might lead to wire breakage. Moreover, storing the excess portion of the USB cable 18b in the storage portion 23 facilitates attachment and removal work of the card reader 18 by service staff or the like. Although a configuration has been described where the storage portion 23 is covered by the cover member 24, the cover member 24 does not need to be provided as long as a configuration is made where the USB cable 18b is generally fixed, being stored in the storage portion 23.

Figure 6:
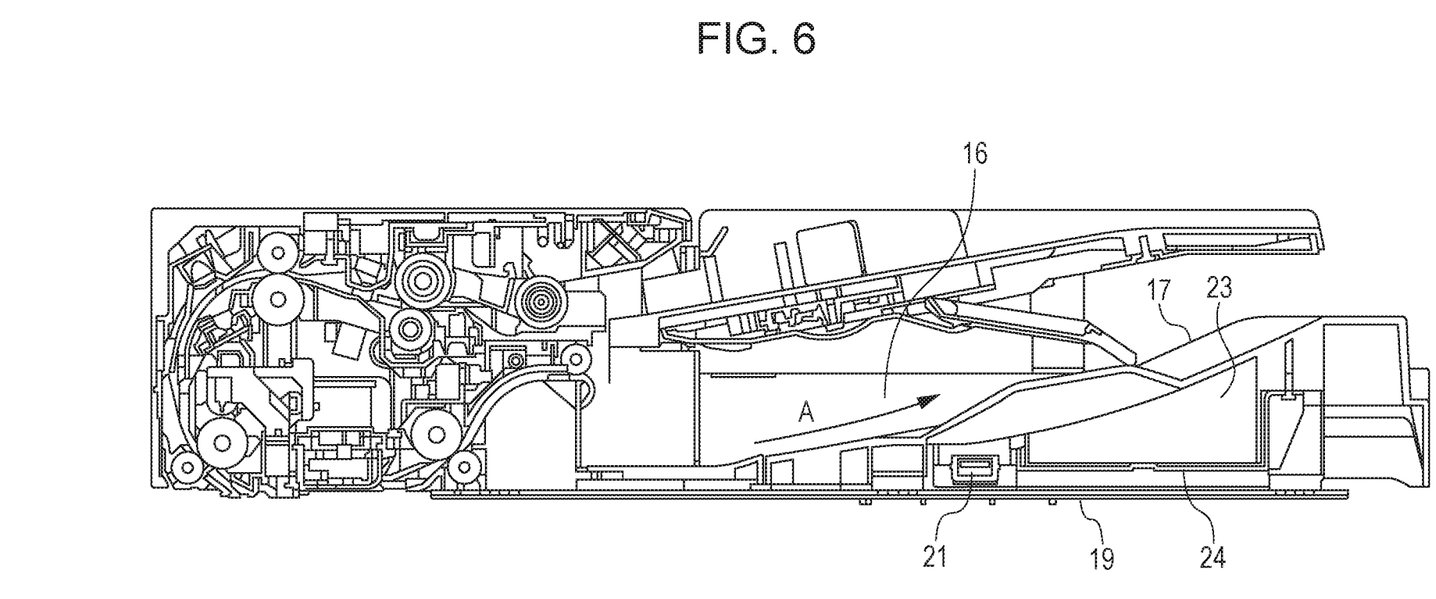
FIG. 6 is a cross-sectional view of the document feeder.

The configuration of the storage portion 23 will be described further. FIG. 6 is a cross-sectional view of the document feeder 10, taken through the storage portion 23. As described earlier, an inclined portion 17 that is a protruding portion is provided as part of the document discharge tray 16. The inclined portion 17 protrudes upwards along a document discharge direction A. The inclined portion 17 is hollow inside in the present embodiment, and this hollow space is used as the storage portion 23. This structure enables the USB cable 18b to be efficiently stored in the limited space of the document feeder 10.

Figure 7:
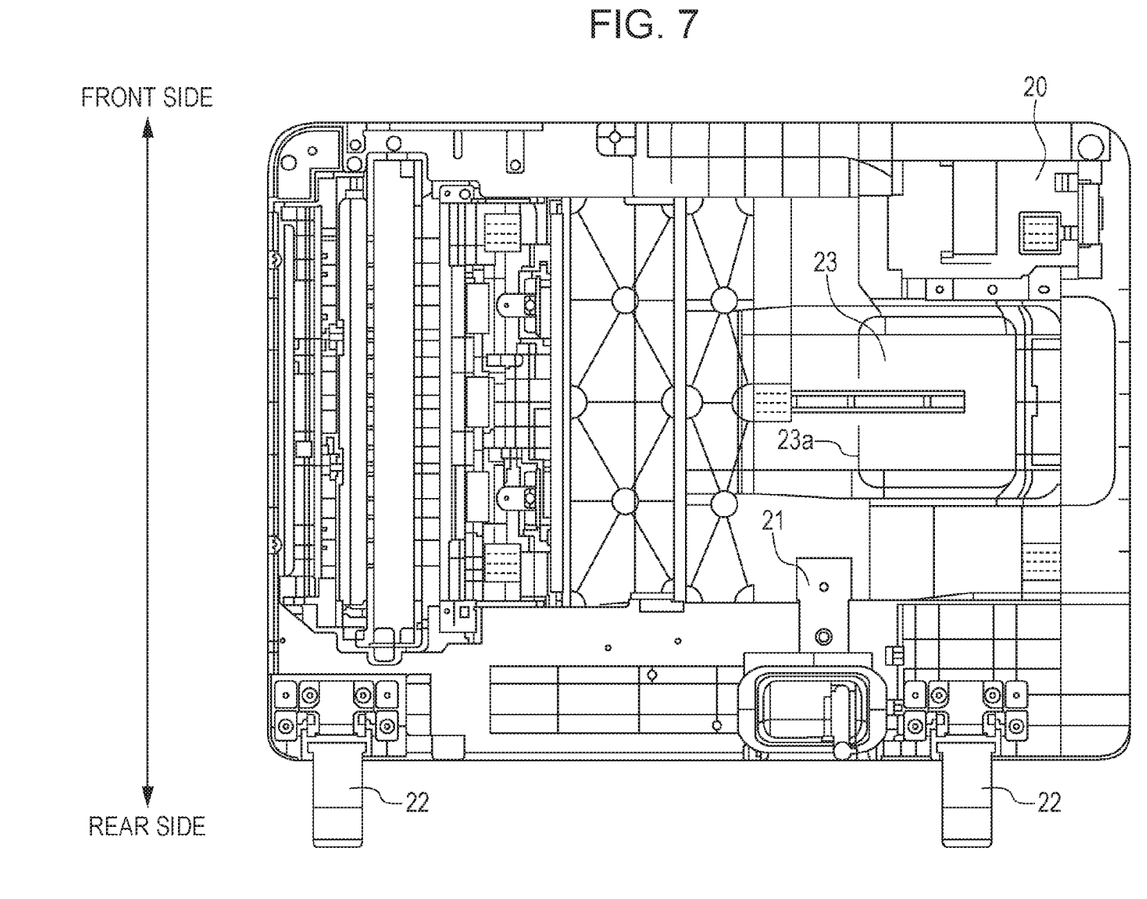
FIG. 7 is a plan view of the document feeder from below.

FIG. 7 is a plan view of the document feeder 10 from below. When the user uses the image forming apparatus 1, the side close to the user is the front, and the side far from the user is the rear. Operations of the user holding the authentication card up to the card reader 18 are easier for the user if the authentication unit B (see FIG. 2B) is at the front. Accordingly, the main unit cover member 20 is provided closer to the front from the middle in the front-rear direction. On the other hand, electric systems such as the controller are disposed at the rear where the user cannot readily access. Accordingly, the USB connecting unit 21 is disposed further toward the rear from the middle in the front-rear direction. The storage portion 23 is provided between the main unit cover member 20 and the USB connecting unit 21 in the front-rear direction. According to this configuration, the excess portion of the USB cable 18b can be easily stored in the storage portion 23.

Second Embodiment

Figure 8A:
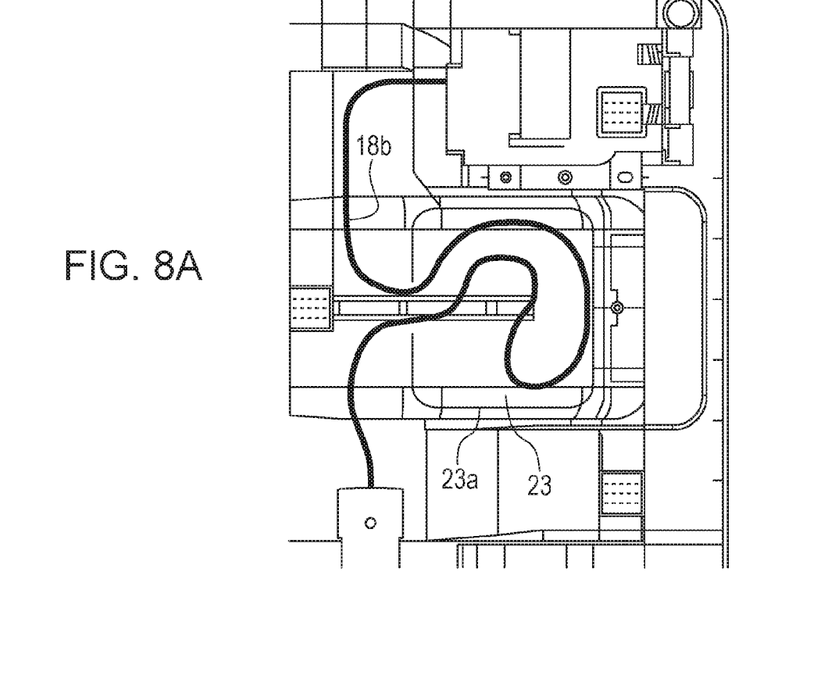
FIG. 8A illustrates a case in which the USB cable is long.
Figure 8B:
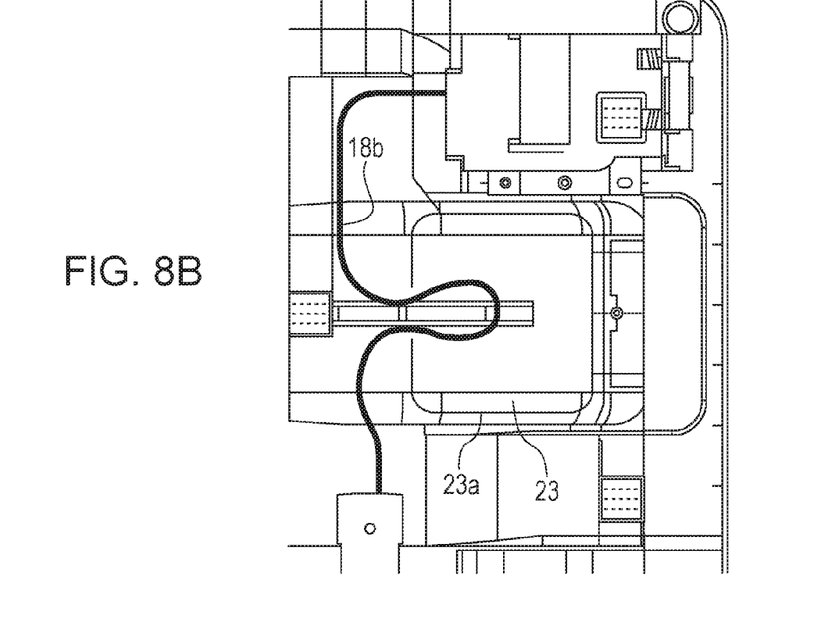
FIG. 8B illustrates a case in which the USB cable is short.

Next, a second embodiment will be described. FIGS. 8A and 8B are explanatory diagrams regarding the first embodiment, where FIG. 8A illustrates a case in which the USB cable is long, and FIG. 8B illustrates a case in which the USB cable is short. In a case where the USB cable 18b is long as illustrated in FIG. 8A, the part of the USB cable 18b stored in the storage portion 23 is sufficiently long. On the other hand, in a case where the USB cable 18b is short as illustrated in FIG. 8B, the part of the USB cable 18b stored in the storage portion 23 is short, and the USB cable 18b may not be sufficiently constrained by the storage portion 23. The second embodiment pertains to suitably storing a short USB cable 18b in the storage portion 23.

Figure 9:
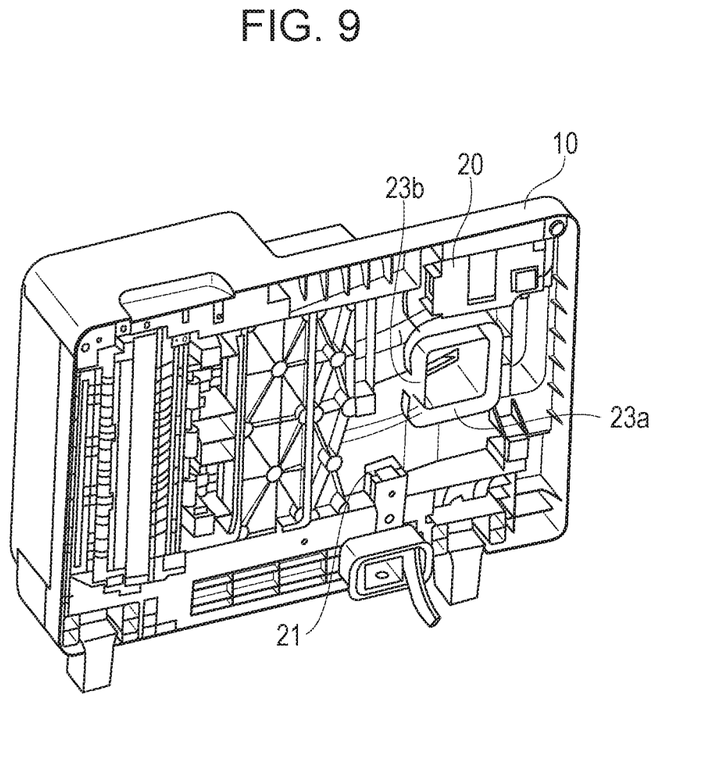
FIG. 9 is a perspective view of a document feeder according to a second embodiment.
Figure 10A:
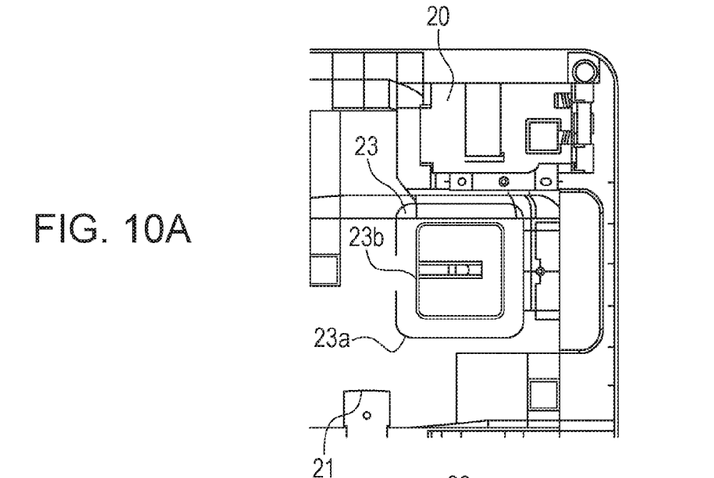
FIGS. 10A through 10C are plan views of the document feeder according to the second embodiment from below.
Figure 10B:
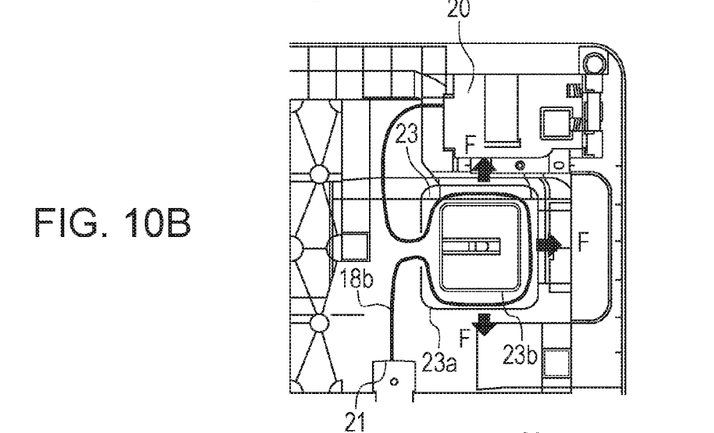
Figure 10C:
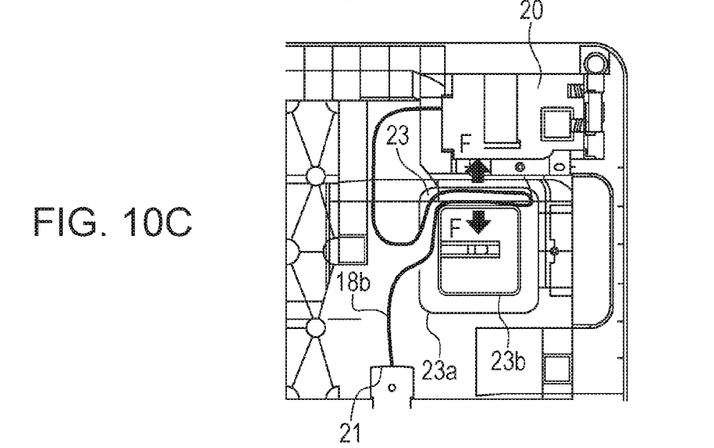

FIG. 9 is a perspective view of the second embodiment. FIGS. 10A through 10C are plan views of the document feeder 10 from below. Note that the cover member 24 has been omitted to facilitate description. The storage portion 23 in the second embodiment further has a rectangular rib 23b on the inner side of the rectangular rib 23a. Other than this point, the second embodiment has the same configuration as the first embodiment. Accordingly, description of the same configurations will be omitted.

FIG. 10B is a diagram illustrating the storage state in a case where the USB cable 18b is long. The USB cable 18b is wrapped around the rib 23b, and is surrounded by the rib 23a. The USB cable 18b exhibits restoration force F due to having been wrapped around the rib 23b, and is pressed against the inner side of the rib 23a. Accordingly, the USB cable 18b is constrained by the storage portion 23.

FIG. 10C is a diagram illustrating the storage state in a case where the USB cable 18b is short. The USB cable 18b is disposed nipped between the rib 23a and the rib 23b. The USB cable 18b exhibits restoration force F, and is pressed against the ribs 23a and 23b. Accordingly, the USB cable 18b is constrained by the storage portion 23.

Thus, according to the structure of the second embodiment, the USB cable 18b can be constrained within the storage portion 23 regardless of whether long or short. As a result, the USB cable 18b can be suppressed from coming loose from the storage portion 23 in a case where the card reader 18 is attached in a state where the document feeder 10 is rotated around 90 degrees as to the reader unit 12, as illustrated in FIG. 9. This facilitates work for the service staff or the like to attach the card reader 18. The USB cable 18b can also be suppressed from coming falling out from the storage portion 23, and occurrence of abnormal sound can be suppressed.

Third Embodiment

Figure 11:
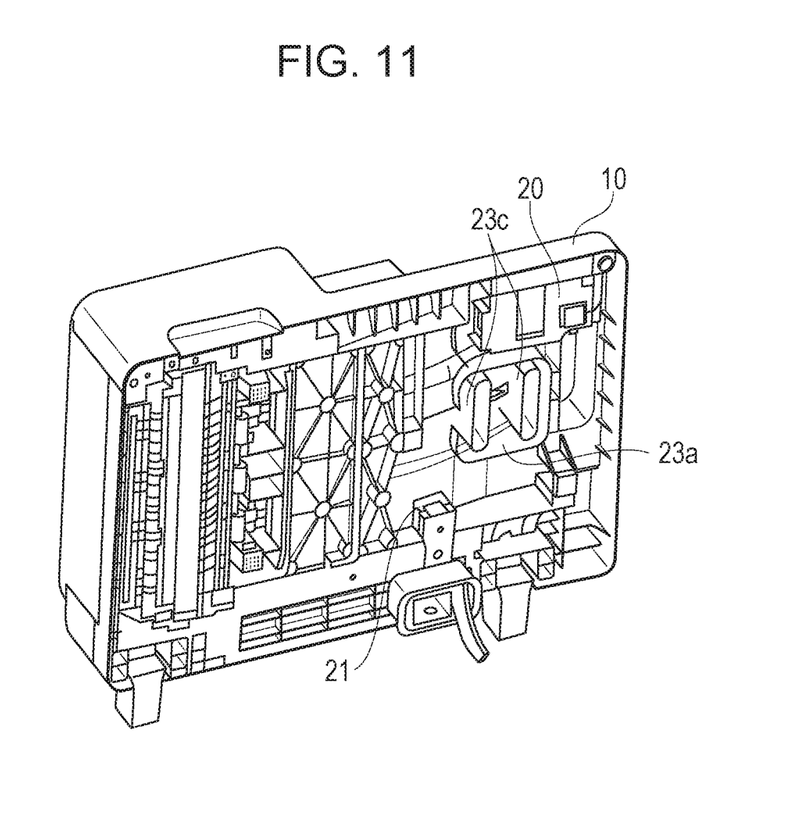
FIG. 11 is a perspective view of a document feeder according to a third embodiment.

Next, a third embodiment will be described. FIG. 11 is a perspective view of the document feeder 10 according to the third embodiment. FIGS. 12A through 13B are plan views of the document feeder 10 from below. Note that the cover member 24 has been omitted to facilitate description. The storage portion 23 in the third embodiment further has rectangular ribs 23c on the inner side of the rectangular rib 23a. Other than this point, the third embodiment has the same configuration as the first embodiment. Accordingly, description of the same configurations will be omitted.

Figure 12A:
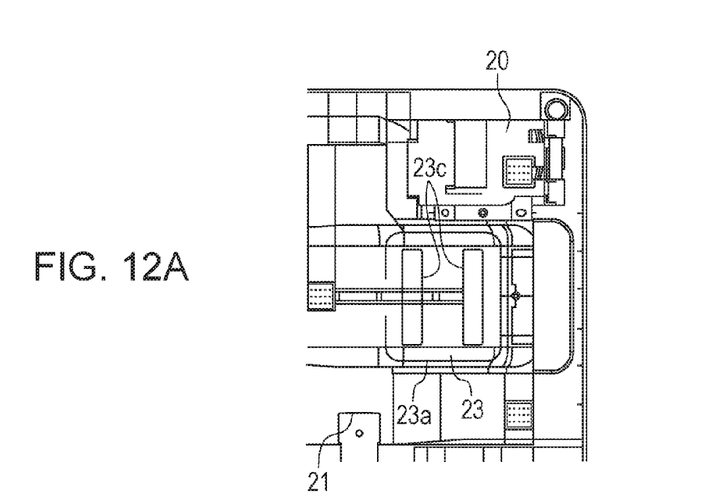
FIGS. 12A through 12C are plan views of the document feeder according to the third embodiment from below.
Figure 12B:
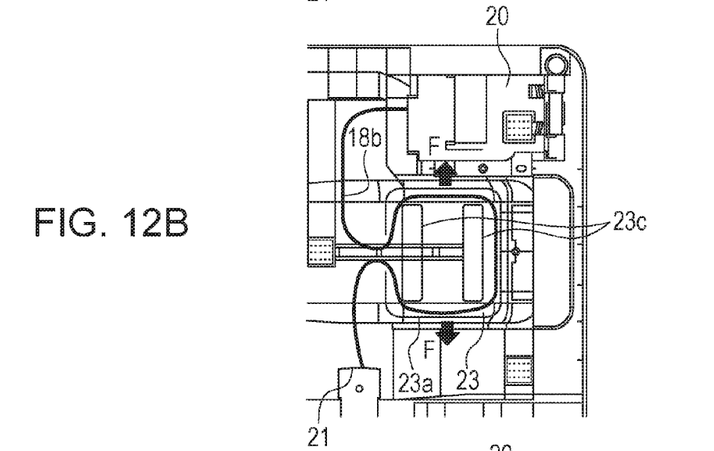

FIG. 12B is a diagram illustrating the storage state in a case where the USB cable 18b is long. The USB cable 18b is wrapped around the ribs 23c, and is surrounded by the rib 23a. The USB cable 18b exhibits restoration force F due to having been wrapped around the ribs 23c, and is pressed against the inner side of the rib 23a. Accordingly, the USB cable 18b is constrained by the storage portion 23.

Figure 12C:
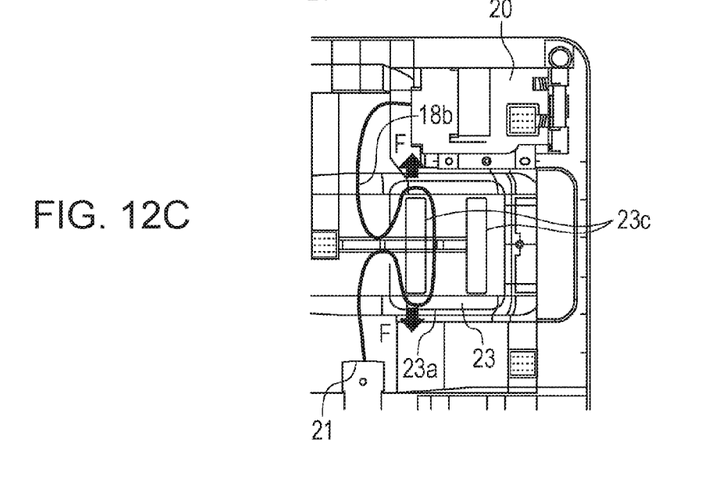

FIG. 12C is a diagram illustrating the storage state in a case where the USB cable 18b is short. The USB cable 18b is wrapped around the one rib 23c, and is surrounded by the rib 23a. The USB cable 18b exhibits restoration force F, and is pressed against the rib 23a. Accordingly, the USB cable 18b is constrained by the storage portion 23.

Figure 13A:
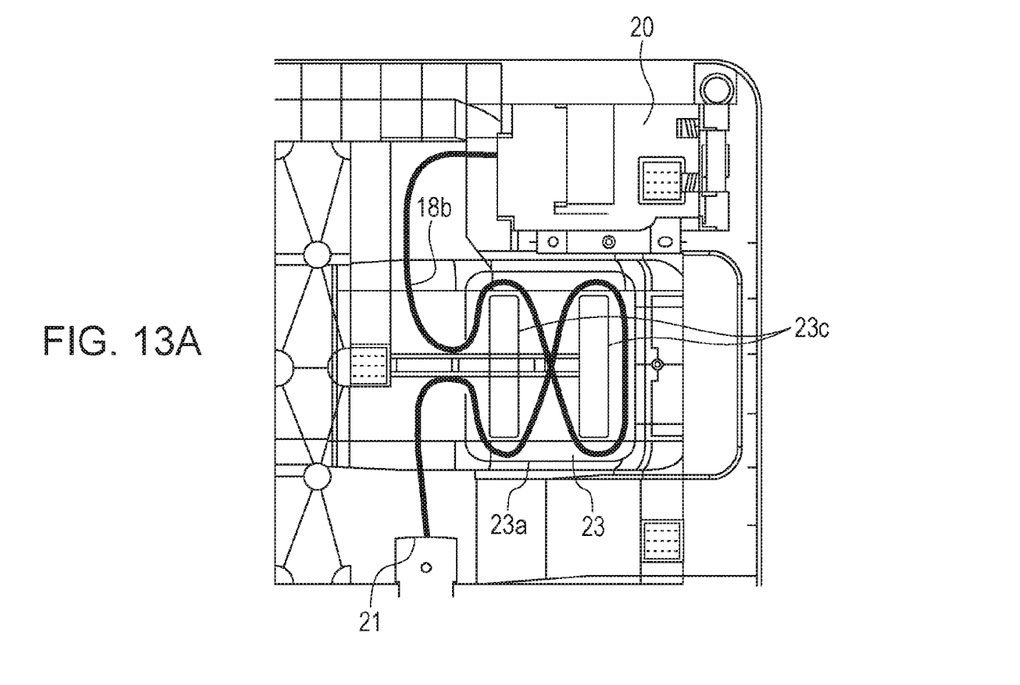
FIGS. 13A and 13B are plan views of the document feeder according to the third embodiment from below.
Figure 13B:
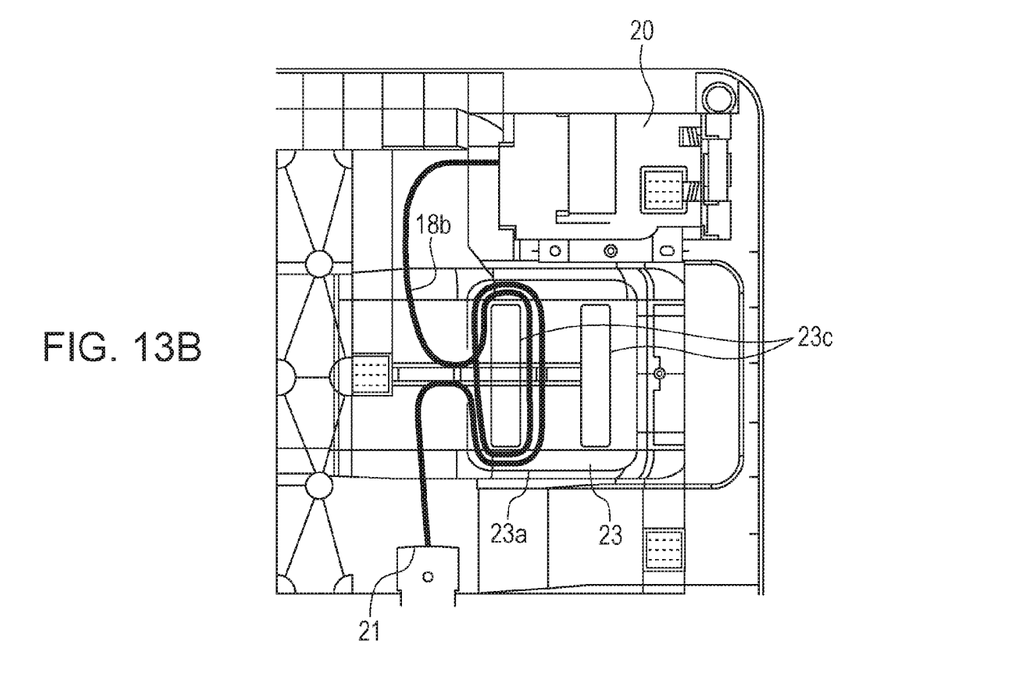

FIGS. 13A and 13B are examples of wrapping in a case where the USB cable 18b is even longer. Providing the multiple ribs 23c enables the way of wrapping to be flexibly changed in accordance with the length of the USB cable 18b as illustrated in FIGS. 13A and 13B, so the USB cable 18b can be constrained within the storage portion 23.

Thus, according to the structure of the third embodiment, the USB cable 18b can be constrained within the storage portion 23 even if very long or short. As a result, the USB cable 18b can be suppressed from coming loose from the storage portion 23 in a case where the card reader 18 is attached in a state where the document feeder 10 is rotated around 90 degrees as to the reader unit 12, as illustrated in FIG. 11. This facilitates work for the service staff or the like to attach the card reader 18. The USB cable 18b can also be suppressed from falling out from the storage portion 23, and occurrence of abnormal sound can be suppressed.

Others

The configurations of the storage portion 23 described in the above embodiments are exemplary. It is sufficient for the storage portion 23 to be provided within the document feeder 10, and to have a configuration whereby a communication cable such as the USB cable 18b can be constrained within the document feeder 10. For example, the following configurations are conceivable. Configurations may be made where a communication cable is surrounded by a rectangular rib 23a, as described in the above embodiments (the rib 23a is not restricted to being rectangular, and may be circular or elliptical). Configurations may be made where a communication cable is constrained by covering with a separate member, such as the cable cover member 24. Configurations may also be made where a communication cable is wrapped around the storage portion, thereby constraining the cable itself.

Although description has been made in the above embodiment regarding a device to which a card reader is attached, by way of an example of the document feeder 10, this is not restrictive. A configuration may be made where a storage portion to store a communication cable is provided within a pressing plate unit that does not have document conveying functions.

Although description has been made in the above embodiment regarding an electrophotographic image forming apparatus, this is not restrictive. The present embodiment may be applied to an ink-jet image forming apparatus that forms images on sheets by discharging ink, instead of an electrophotographic image forming apparatus.

Although description has been made in the above embodiment regarding an example of using a card reader as an authentication device that is a communication unit that wirelessly communicates with the user, this is not restrictive. The present embodiment may be applied to other authentication devices such as fingerprint authentication devices, biometric authentication devices (vein authentication), and so forth. Further, application may be made to communication devices that communicate data of images using Near Field Communication (NFC), other than authentication devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200409 filed Oct. 11, 2016, which is hereby incorporated by reference herein in its entirety.

What is claimed is:

1. An image reading device comprising:
a reading unit having a reading glass, and a reader configured to read an image on a document on the reading glass;
a document feeding device configured to turn with respect to the reading unit, wherein the document feeding device includes:
a conveying unit configured to convey a document,
an attachment part to which a communication unit for acquiring information about a user using the image reading device is attached, wherein the communication unit is connected to a connecting unit with a cable having one end connected to the connecting unit and the other end connected to the communication unit;
a discharging unit configured to discharge the document conveyed by the conveying unit;
a discharge tray on which documents discharged by the discharging unit are to be stacked, wherein the discharge tray is configured to include an inclined portion that protrudes upward in a vertical direction in comparison with an area where the communication unit is to be attached; and
a storage portion provided in a space formed inside the document feeding device by protrusion of the inclined portion upward and configured to store a meandering portion of the cable.

2. The image reading device according to claim 1, wherein the storage portion includes a first rib to surround a region where the meandering portion of the cable is to be stored.

3. The image reading device according to claim 2, wherein the storage portion further includes a second rib about which the meandering portion of the cable is to be wound.

4. The image reading device according to claim 3, wherein the second rib includes a plurality of ribs.

5. The image reading device according to claim 2, wherein the storage portion includes a cover portion detachably mounted to the document feeding device and configured to cover the first rib.

6. The image reading device according to claim 1, wherein the meandering portion of the cable is an excess that arises because a length of the cable is greater than a distance between the connecting unit and the communication unit.

7. The image reading device according to claim 1, wherein the storage portion is disposed between the attachment part and the connecting unit in a direction perpendicular to a turning axis of the document feeding device.

8. An image forming apparatus comprising:
an image reading unit having a reading glass, and a reader configured to read an image on a document on the reading glass;
an image forming unit configured to form images based on image information read by the image reading unit;

a document feeding device configured to turn with respect to the image reading unit, wherein the document feeding device includes:
a conveying unit configured to convey a document,
an attachment part to which a communication unit for acquiring information about a user using the image reading device is attached, wherein the communication unit is connected to a connecting unit with a cable having one end connected to the connecting unit and the other end connected to the communication unit;
a discharging unit configured to discharge the document conveyed by the conveying unit;
a discharge tray on which documents discharged by the discharging unit are to be stacked, wherein the discharge tray is configured to include an inclined portion that protrudes upward in a vertical direction in comparison with an area where the communication unit is to be attached; and
a storage portion provided in a space formed inside the document feeding device by protrusion of the inclined portion upward and configured to store a meandering portion of the cable.

9. An image reading device comprising:
a reading unit having a reading glass, and a reader configured to read an image on a document on the reading glass;
a document feeding device configured to turn with respect to the reading unit, wherein the document feeding device includes:
a conveying unit configured to convey a document,
an attachment part to which a communication unit for acquiring information about a user using the image reading device is attached, wherein the communication unit is connected to a connecting unit with a cable having one end connected to the connecting unit and the other end connected to the communication unit;
a discharging unit configured to discharge the document conveyed by the conveying unit;
a discharge tray on which documents discharged by the discharging unit are to be stacked; and
an inclined portion provided on a downstream side of the discharge tray in a discharging direction in which the document is to be discharged,
wherein a position in a vertical direction of a top surface of the inclined portion at a first position in the discharging direction is located lower than a position in the vertical direction of the top surface of the inclined portion at a second position that is located on a downstream side of the first position in the discharge direction, and
wherein a space formed below the inclined portion and on an inner side of the document feeding device includes a region where a meandering portion of the cable is to be stored.

10. The image reading device according to claim 9, wherein the space includes a first rib configured to surround a portion of the region.

11. The image reading device according to claim 10, wherein the document feeding device includes a cover portion detachably mounted to the document feeding device and configured to cover the first rib.

12. The image reading device according to claim 10, wherein the region includes a second rib about which the meandering portion of the cable is to be wound.

13. The image reading device according to claim 12, wherein the second rib includes a plurality of ribs.

14. The image reading device according to claim 9, wherein the image reading device further comprises a receiving unit including the connecting unit and configured to receive the information about the user from the communication unit through the cable and the connecting unit.

15. The image reading device according to claim 9,
wherein the documents discharged by the discharging unit are to be stacked on the inclined portion,
wherein a length of the inclined portion in a width direction intersecting with the discharging direction is shorter than a length of the document in the width direction, and
wherein a position in the vertical direction of a first surface as the top surface of the inclined portion at a third position in the discharging direction is located higher than a position in the vertical direction of a second surface as a top surface of the document feeding device provided at a position different from the position of the inclined portion provided in the width direction, at the third position.

16. The image reading device according to claim 15, wherein the communication unit is attached below the second surface and on an inner side of the document feeding device.

17. The image reading device according to claim 9, wherein the meandering portion of the cable is an excess of the cable that arises because a length of the cable is greater than a distance between the connecting unit and the communication unit.

18. The image device according to claim 9,
wherein a distance between the attachment part and a turning axis of the document feeding device is longer than a distance between the connecting unit and the turning axis, and
wherein the region where the meandering portion of the cable is to be stored is disposed between the attachment part and the connecting unit in a direction perpendicular to the turning axis.

19. The image reading device according to claim 9, wherein the communication unit is a card reader configured to acquire the information about the user via a wireless communication.

* * * * *